United States Patent
Ota (10) Patent No.: US 11,118,554 B2
(45) Date of Patent: Sep. 14, 2021

(54) INTERNAL COMBUSTION ENGINE AND CONTROL OF THE ENERGIZATION TO AN IGNITION COIL AND ENERGIZATION TO AN INJECTOR

(71) Applicant: TOYOTA JIDOSHA KABUSHIKI KAISHA, Toyota (JP)

(72) Inventor: Tomoya Ota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 16/351,948

(22) Filed: Mar. 13, 2019

(65) Prior Publication Data
US 2019/0331082 A1 Oct. 31, 2019

(30) Foreign Application Priority Data

Apr. 25, 2018 (JP) .............................. JP2018-084375

(51) Int. Cl.
*F02P 5/04* (2006.01)
*F02P 5/15* (2006.01)
*B60W 20/00* (2016.01)
*F02D 41/34* (2006.01)
(Continued)

(52) U.S. Cl.
CPC ............. *F02P 5/045* (2013.01); *B60W 20/00* (2013.01); *F02D 37/02* (2013.01); *F02D 41/34* (2013.01); *F02D 41/345* (2013.01); *F02P 5/15* (2013.01); *B60K 6/24* (2013.01); *B60Y 2200/92* (2013.01)

(58) Field of Classification Search
CPC . F02P 5/045; F02P 5/15; B60W 20/00; F02D 41/345; F02D 41/34; F02D 37/02; B60Y 2200/92; B60K 6/24
See application file for complete search history.

(56) References Cited

U.S. PATENT DOCUMENTS 5,676,108 A * 10/1997 Akimoto ................. F02P 5/045
  123/305
5,749,334 A *  5/1998 Oda ........................ F02B 47/08
  123/305
(Continued)

FOREIGN PATENT DOCUMENTS

JP     H06-017695 A    1/1994
JP     H09-151758 A    6/1997
(Continued)

*Primary Examiner* — Geepy Pe
*Assistant Examiner* — Kyle J Kingsland
(74) *Attorney, Agent, or Firm* — Oliff PLC (57) ABSTRACT

An internal combustion engine according to the present disclosure has an ignition coil and an injector that share a power source, and has a controller that controls energization to the ignition coil and energization to the injector. The controller executes setting processing and correction processing. In the setting processing, the controller sets an energization period of the ignition coil in accordance with an operating condition of the internal combustion engine. In the correction processing, when the energization period of the ignition coil overlaps with an energization period of the injector, the controller corrects the energization period of the ignition coil so as to reduce an overlap period between the energization period of the ignition coil and the energization period of the injector.

5 Claims, 9 Drawing Sheets

(51) Int. Cl.
*F02D 37/02* (2006.01)
*B60K 6/24* (2007.10)

(56) References Cited

U.S. PATENT DOCUMENTS

| | | | |
|---|---|---|---|
| 2011/0017172 A1* | 1/2011 | Shigenaga | G01L 23/225 |
| | | | 123/406.26 |
| 2017/0248090 A1* | 8/2017 | Fukuda | F02D 31/003 |
| 2018/0202385 A1* | 7/2018 | Miwa | B60W 10/08 |

FOREIGN PATENT DOCUMENTS

| | | | | |
|---|---|---|---|---|
| JP | 2006-266257 A | 10/2006 | | |
| JP | 2010-013982 A | 1/2010 | | |
| WO | WO-2008035190 A2 * | 3/2008 | | F02P 5/045 |

* cited by examiner

INTERNAL COMBUSTION ENGINE AND CONTROL OF THE ENERGIZATION TO AN IGNITION COIL AND ENERGIZATION TO AN INJECTOR

CROSS-REFERENCE TO RELATED APPLICATION

This application claims priority to Japanese Patent Application No. 2018-084375, filed on Apr. 25, 2018, which is incorporated by reference herein in its entirety.

BACKGROUND

Field

The present disclosure relates to an internal combustion engine, especially a spark ignition type internal combustion engine and a hybrid vehicle equipped with the internal combustion engine.

Background Art

As for a spark ignition type internal combustion engine, particularly a multi-cylinder internal combustion engine, there is a case where an energization period of an injector partially overlaps with an energization period of an ignition coil. In general, the ignition coil and the injector share a power source. Therefore, when the energization period of the injector overlaps with the energization period of the ignition coil, voltage applied to the injector decreases and thereby operation of the injector is delayed. Delay in the operation of the injector may lead to a shortage of a fuel injection amount and cause deterioration of emission performance due to an air-fuel ratio being made lean.

Regarding this problem, JPH06-017695A discloses that, when the energization period of the injector overlaps with the energization period of the ignition coil, the energization period of the injector is retarded to an extent that doesn't overlap with the energization period of the ignition coil.

SUMMARY

However, retarding the energization period of the injector will delay the fuel injection timing and shorten the period until ignition in the same cylinder. Since it takes time for injected fuel to be atomized, if the energization period of the injector is excessively retarded, unburned HC is generated because enough time for fuel atomization cannot be obtained, and HC concentration in exhaust gas increases.

The present disclosure has been devised in view of such problems, and an object of the present disclosure is to, as for an internal combustion engine with an ignition coil and an injector that shares a power source, decrease an overlap period between an energization period of the ignition coil and an energization period of the injector while avoiding excessive retardation of the energization period of the injector.

The present disclosure provides an internal combustion engine. The internal combustion engine according to the present disclosure has an ignition coil and an injector that shares a power source and has also a controller that controls energization to the ignition coil and energization to the injector. The controller is configured to perform setting processing and correction processing. The setting processing is processing of setting the energization period of the ignition coil according to an operating condition of the internal combustion engine. The correction processing is processing of, when the energization period of the ignition coil overlaps with an energization period of the injector, correcting the energization period of the ignition coil so as to reduce an overlap period between the energization period of the ignition coil and the energization period of the injector.

According to the internal combustion engine according to the present disclosure, since the overlap period between the energization period of the ignition coil and the energization period of the injector is reduced by correction of the energization period of the ignition coil, excessive retardation of the energization period of the injector is avoided. Note that reducing the overlap period between the energization period of the ignition coil and the energization period of the injector includes removing the overlap period.

As for one embodiment of the internal combustion engine according to the present disclosure, in the setting processing, the controller may set the energization period of the ignition coil in accordance with the operating condition of the internal combustion engine and also set the energization period of the injector in accordance with the operating condition of the internal combustion engine. In the correction processing under such the setting processing, the controller may correct the energization period of the ignition coil when the overlap period is not removed by correcting the energization period of the injector within a range from a predetermined retardation limit to a predetermined advance limit.

According to the setting processing and correction processing as above, if the overlap period is removed by correcting the energization period of the injector, it is possible to energize the ignition coil with the energization period set in accordance with the operating condition of the internal combustion engine. Also, even if correction of the energization period of the ignition coil is executed, a correction amount of the energization period of the ignition coil is minimized. Note that, since HC concentration in exhaust gas increases as the energization period of the injector is retarded, a retardation limit of the energization period of the injector may be determined according to an allowable limit value of the HC concentration in the exhaust gas.

As for another embodiment of the internal combustion engine according to the present disclosure, in the setting processing, the controller may set the energization period of the ignition coil in accordance with the operating condition of the internal combustion engine and also set the energization period of the injector within a range from a predetermined retardation limit to a predetermined advance limit so as to minimize the overlap period.

According to the setting processing as above, if setting of the energization period of the injector doesn't generate the overlap period, it is possible to energize the ignition coil with the energization period set in accordance with the operating condition of the internal combustion engine. Note that, even if the energization period of the ignition coil overlaps with the energization period of the injector, the overlap period is minimized and thereby a correction amount of the energization period of the ignition coil is minimized.

As for the internal combustion engine according to the present disclosure, in the setting processing, the controller may set the energization period of the ignition coil to adjust an ignition timing to a MBT. In the correction processing under such the setting processing, the controller may advance the energization period of the ignition coil within a range where the ignition timing isn't advanced excessively over a knocking ignition timing, or may retard the energization period of the ignition coil within a range where the ignition timing isn't retarded excessively over a misfire limit ignition timing. According to this, occurrence of knocking due to the ignition timing being advanced over the knocking ignition timing from the MBT can be prevented. Also, occurrence of misfire due to the ignition timing being retarded over the misfire limit ignition timing from the MBT can be prevented.

As for the internal combustion engine according to the present disclosure, in the setting processing, the controller may set the energization period of the ignition coil to match an ignition timing with a knocking ignition timing. In the correction processing under such the setting processing, the controller may retard the energization period of the ignition coil within a range where the ignition timing isn't retarded excessively over a misfire limit ignition timing. According to this, occurrence of misfire due to the ignition timing being retarded over the misfire limit ignition timing from the knocking ignition timing can be prevented.

As for yet another embodiment of the internal combustion engine according to the present disclosure, in the setting processing, the controller may set the energization period of the ignition coil to adjust an ignition timing to a MBT and also set the energization period of the injector in accordance with the operating condition of the internal combustion engine. In the correction processing under such the setting processing, the controller may correct the energization period of the ignition coil within a range where a torque decrease rate with respect to a torque obtained at the MBT becomes equal to or less than a predetermined value and, when the overlap period is not removed by correcting the energization period of the ignition coil, also may correct the energization period of the injector within a range from a predetermined retardation limit to a predetermined advance limit.

According to the setting processing and correction processing as above, if the overlap period is removed by correcting the energization period of the ignition coil within a range where a torque is suppressed from decreasing, it is possible to energize the injector with the energization period set in accordance with the operating condition of the internal combustion engine. Also, even if correction of the energization period of the injector is conducted, a correction amount of the energization period of the injector is minimized.

As for yet another embodiment of the internal combustion engine according to the present disclosure, in the setting processing, the controller may set the energization period of the injector in accordance with the operating condition of the internal combustion engine and also set the energization period of the ignition coil so as to minimize the overlap period within a range where a torque decrease rate with respect to a torque obtained at a MBT becomes equal to or less than a predetermined value. In the correction processing under such the setting processing, when the overlap period is not removed by correcting the energization period of the injector within a range from a predetermined retardation limit to a predetermined advance limit, the controller may advance the energization period of the ignition coil within a range where the ignition timing isn't advanced excessively over the knocking ignition timing, or may retard the energization period of the ignition coil within a range where the ignition timing isn't retarded excessively over the misfire limit ignition timing.

According to the setting processing and correction processing as above, if the overlap period is not generated by setting of the energization period of the ignition coil within a range where a torque is suppressed from decreasing, it is possible to energize the injector with the energization period set in accordance with the operating condition of the internal combustion engine. Also, even if correction of the energization period of the injector is executed, a correction amount of the energization period of the injector is minimized. Further, even if the overlap period is not removed by the correction of the energization period of the injector, the overlap period can be removed or shortened by correcting the energization period of the ignition coil.

Further, the present disclosure provides a hybrid vehicle. The hybrid vehicle according to the present disclosure has the internal combustion engine according to the present disclosure and an electric motor, and is capable of adding driving force output from the electric motor to driving force output from the internal combustion engine. The hybrid vehicle is configured to, when the driving force output from the internal combustion engine decreases due to correction of the energization period of the ignition coil, compensate for a decrease of the driving force output from the internal combustion engine by the driving force output from the electric motor.

According to the hybrid vehicle according to the present disclosure, even if the driving force of the internal combustion engine decreases due to the correction of the energization period of the ignition coil, the decrease of the driving force output from the internal combustion engine can be compensated by the driving force output from the electric motor. For this reason, it is possible to ensure driving force and driving force responsiveness under various conditions while avoiding excessive retardation of the energization period of the injector.

As described above, according to the internal combustion engine according to the present disclosure, it is possible to decrease the overlap period between the energization period of the ignition coil and the energization period of the injector while avoiding excessive retardation of the energization period of the injector.

Also, according to the hybrid vehicle according to the present disclosure, it is possible to ensure driving force and driving force responsiveness under various conditions while avoiding excessive retardation of the energization period of the injector.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures and steps that are described in the embodiments shown as follows are not always indispensable to the disclosure unless specially explicitly shown otherwise, or unless the disclosure is explicitly specified by the structures or the steps theoretically.

1. Configuration of Hybrid Vehicle

Figure 1:
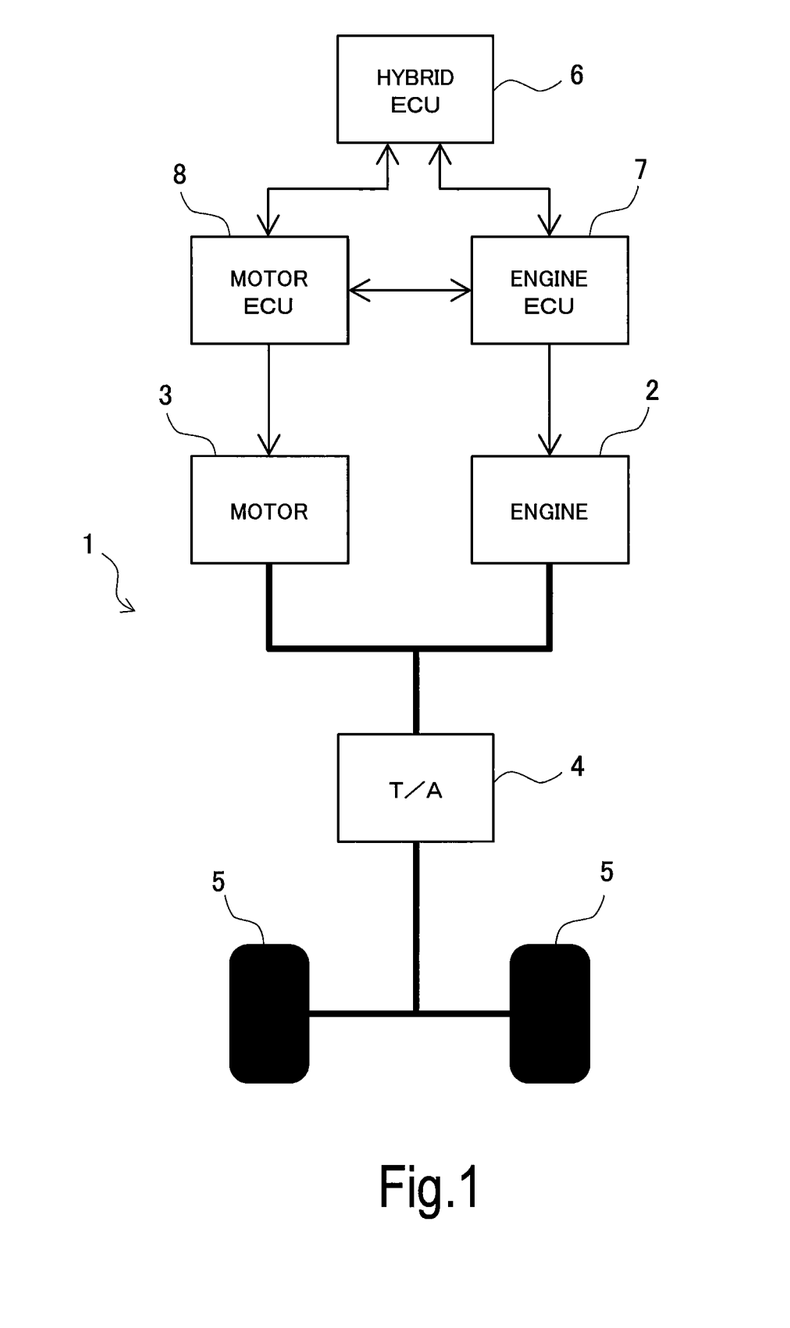
FIG. 1 shows a configuration of a hybrid vehicle common to each embodiment of the present disclosure.

FIG. 1 shows a configuration of a hybrid vehicle 1 common to each embodiment of the present disclosure. The hybrid vehicle 1 has a power train including an internal combustion engine 2, an electric motor 3 and a transaxle 4. The power train is a so-called parallel type hybrid system that can add driving force from the electric motor 3 to driving force from the internal combustion engine 2. The internal combustion engine 2 is a spark ignition engine. The electric motor 3 is an AC synchronous generator motor having both a function as an electric motor that outputs torque by using supplied electric power and a function as a generator that converts input mechanical power into electric power. Hereinafter, as shown in FIG. 1, the internal combustion engine 2 is simply referred to as "engine", and the electric motor 3 is simply referred to as "motor". In FIG. 1, a path of driving force from the engine 2 and the motor 3 to wheels 5 is drawn by a bold line.

The hybrid vehicle 1 includes a hybrid ECU 6 that is a controller for controlling the entire hybrid system, an engine ECU 7 that is a controller for controlling the engine 2, and a motor ECU 8 that is a controller for controlling the motor 3. The engine ECU 7 controls the engine 2 based on an instruction from the hybrid ECU 6, and the motor ECU 8 controls the motor 3 based on an instruction from the hybrid ECU 6. Also, between these ECUs 6, 7 and 8, information necessary for controlling the hybrid system is exchanged.

2. Driving Force Control for Hybrid Vehicle

Figure 2:
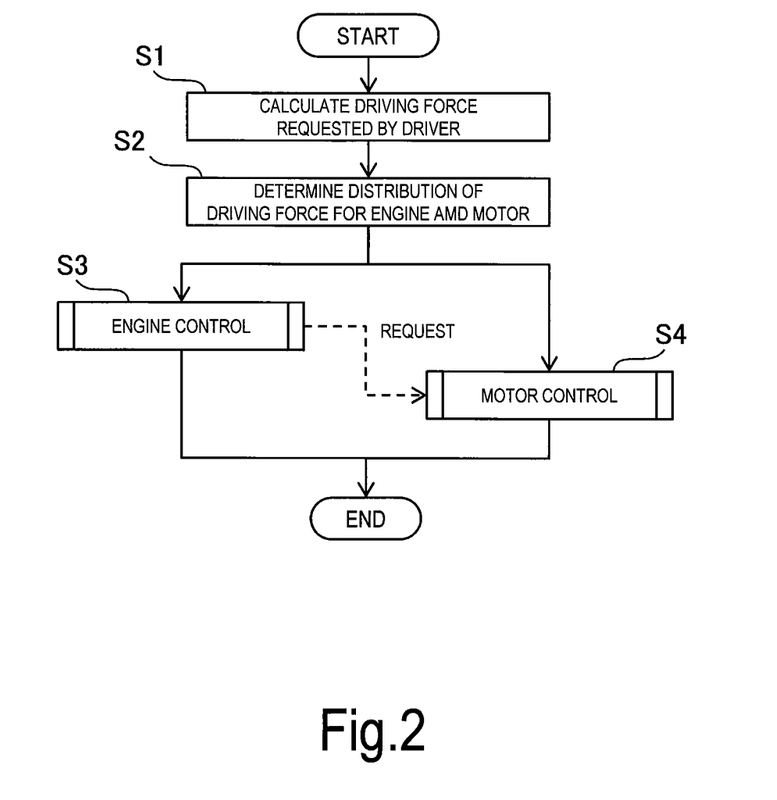
FIG. 2 is a flowchart showing a control flow of driving force control.

The driving force of hybrid vehicle 1 is controlled by cooperation of the ECUs 6, 7 and 8. FIG. 2 is a flowchart showing a control flow of driving force control. In step S1, driving force requested by the driver is calculated based on a depression amount of an accelerator pedal. Next, in step S2, distribution of the driver requested driving force calculated in step S1 for the engine 2 and the motor 3 is determined. The driving force distribution is determined based on, for example, a vehicle speed, a required driving force, a SOC of a running battery, and the like. The processing in steps S1 and S2 is performed by the hybrid ECU 6.

In step S3, the engine 2 is controlled by the engine ECU 7 in accordance with the driving force distribution determined in step S2. In step S4, the motor 3 is controlled by the motor ECU 8 in accordance with the driving force distribution determined in step S2. The engine control in step S3 and the motor control in step S4 are performed in parallel. When it is determined that driving force is insufficient in the engine control in step S3, a request is issued from the engine ECU 7 to the motor ECU 8 so that a shortage of driving force is compensated by the driving force of the motor 3. In this case, in step S4, the motor 3 is controlled so as to generate the total driving force of the driving force distributed from the hybrid ECU 6 and the shortage of driving force of the engine 2.

3. Configurations of Engine and Engine ECU

Figure 3:
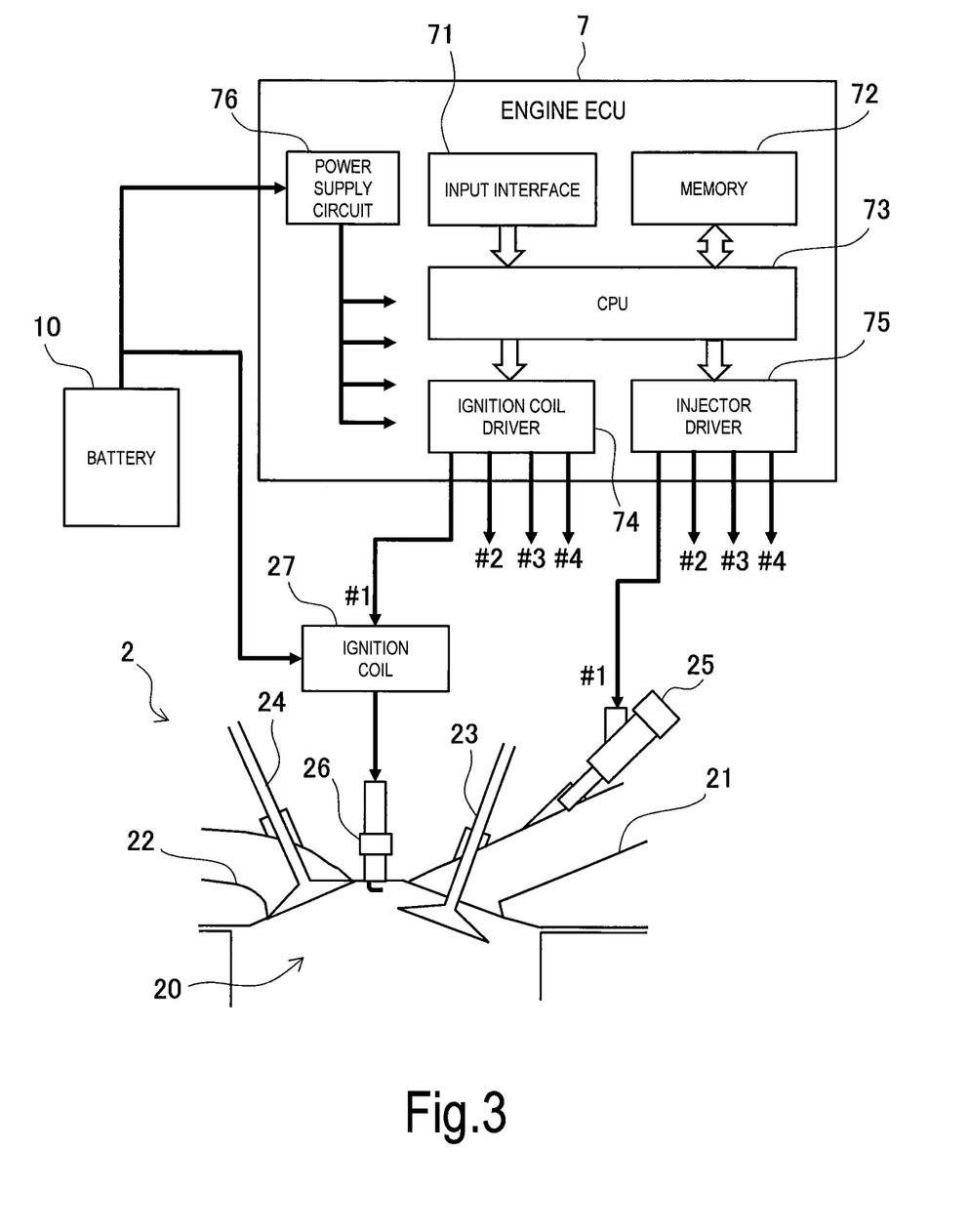
FIG. 3 shows configurations of an internal combustion engine and its controller common to each embodiment of the present disclosure.

FIG. 3 shows configurations of the engine 2 and the engine ECU 7 that are common to each embodiment of the present disclosure. The engine 2 is a multi-cylinder engine having a plurality of combustion chambers 20. Here, it is assumed that the engine 2 is a 4-cylinder engine. Also, in FIG. 3, the first cylinder is denoted as #1, the second cylinder is denoted as #2, the third cylinder is denoted as #3, and the fourth cylinder is denoted as #4. The configuration of the engine 2 drawn in FIG. 3 is the configuration around the combustion chamber 20 of the first cylinder.

An intake port 21 and an exhaust port 22 are connected to the combustion chamber 20. An intake valve 23 driven by a cam is provided in an opening portion of the intake port 21 that communicates with the combustion chamber 20. An exhaust valve 24 that is driven by a cam is provided in an opening portion of the exhaust port 22 that communicates with the combustion chamber 20. In the intake port 21, an injector 25 for injecting fuel to the intake port 21 is attached. The injector 25 is operated by a driving signal input from the engine ECU 7.

A spark plug 26 is attached to the top of the combustion chamber 20. An ignition coil 27 integrated with an ignitor is attached to the spark plug 26. In the present embodiment, one ignition coil 27 is provided for one spark plug 26. A battery 10 is connected to a primary coil of the ignition coil 27. The engine ECU 7 is connected to the ignitor. The ignitor is turned on and off by an ignition instruction signal input from the engine ECU 7. Primary current flowing through the primary coil is energized by turning on the ignitor and is shut off by turning off the ignitor. When the primary current is shut off, high voltage is generated in a secondary coil of the ignition coil 27 by electromagnetic induction, and a spark occurs between gaps of the spark plug 26.

The engine ECU 7 includes an input interface 71, a memory 72, a CPU 73, an ignition coil driver 74, an injector driver 75, and a power supply circuit 76. Signals from sensors attached to various places of the hybrid vehicle 1 including the engine 2 and signals from other ECUs including the hybrid ECU 6 and the motor ECU 8 are input to the input interface 71. The memory 72 stores various programs for controlling the engine 2 and various types of data (including maps). When the program stored in the memory 72 is executed by the CPU 73, various kinds of engine control are realized by the engine ECU 7.

The ignition coil driver 74 outputs an ignition instruction signal to the ignition coil 27 of each cylinder in accordance with an instruction from the CPU 73. The injector driver 75 outputs a driving signal to the injector 25 of each cylinder in accordance with an instruction from the CPU 73. The power supply circuit 76 boosts or steps down input voltage from the battery 10, thereby generating voltage to be supplied to each part of the engine ECU 7 including the CPU 73, the ignition coil driver 74, and the injector driver 75. The voltage supplied from the power supply circuit 76 to the ignition coil driver 74 is used to generate the ignition instruction signal supplied from the ignition coil driver 74 to the ignition coil 27. The driving signal supplied from the injector driver 75 to the injector 25 is also generated using the voltage supplied from the power supply circuit 76.

4. Setting of Injection Timing and Ignition Timing

Engine control by the ECU 7 includes fuel injection control and ignition control. In the fuel injection control, fuel injection timing by the injector 25 is set in accordance with the operating condition of the engine 2. In the ignition control, ignition timing by the spark plug 26 is set in accordance with the operating condition of the engine 2.

Figure 4:
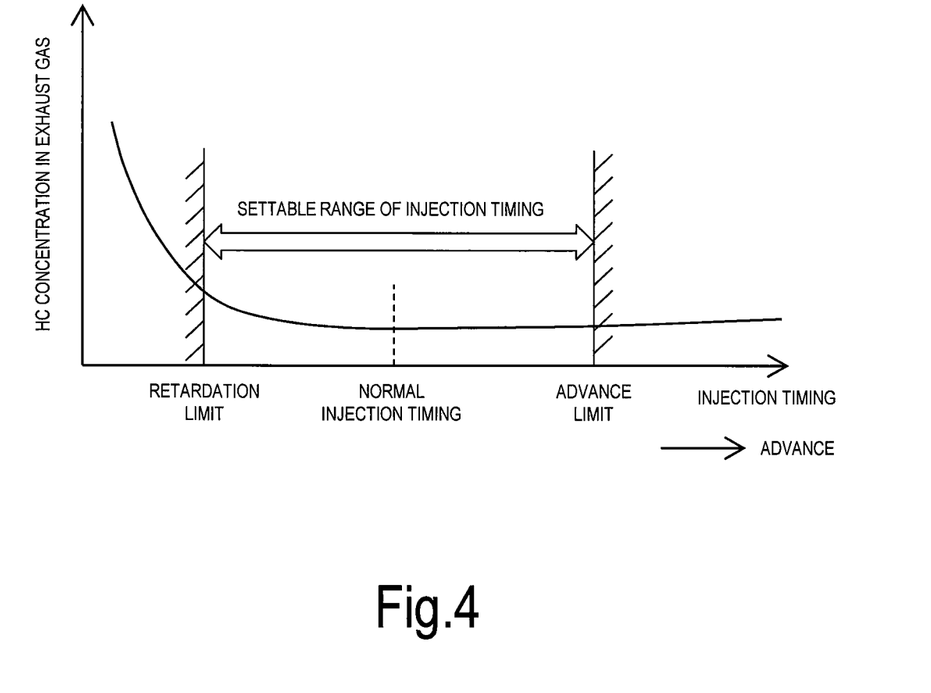
FIG. 4 is a diagram for illustrating a settable range of an injection timing of an injector.

Setting of the injection timing and the ignition timing will be described with reference to FIGS. 4, 5, and 6. First, FIG. 4 is a diagram for illustrating a settable range of the injection timing. The horizontal axis of the graph shown in FIG. 4 represents the injection timing, and the vertical axis of the graph represents HC concentration in exhaust gas. The injection timing, in detail, means an injection end timing at which the injector 25 finishes injecting the fuel. As shown in the graph, the injection timing includes an injection timing that minimizes the HC concentration in the exhaust gas. The engine ECU 7 sets the injection timing at which the HC concentration in the exhaust gas becomes minimum as a normal injection timing.

When the injection timing deviates from the normal injection timing, the HC concentration in the exhaust gas increases. However, since there is an allowable limit value for the HC concentration in the exhaust gas, the setting of the injection timing is allowed to change as long as the HC concentration does not exceed the allowable limit value. The HC concentration in the exhaust gas increases rapidly as the injection timing is retarded from the normal injection timing. This is because sufficient time for atomization of fuel cannot be obtained before ignition. The injection timing, at which the HC concentration in the exhaust gas reaches the allowable limit value when retarding the injection timing, is a retardation limit of the injection timing.

When the injection timing is advanced from the normal injection timing, the HC concentration in the exhaust gas does not increase greatly. However, due to reasons other than the HC concentration in the exhaust gas, an advance limit is provided for the injection timing (this will be described later). If the injection timing is changed within a range from the retardation limit to the advance limit, deterioration of emission performance can be suppressed. In the fuel injection control by the engine ECU 7, the injection timing is set with reference to the normal injection timing within the range from the retardation limit to the advance limit. Note that, in the memory 72 of the engine ECU 7, a map in which a retardation limit and an advance limit of an injection timing are related to an operating condition of the engine 2 is stored.

Figure 5:
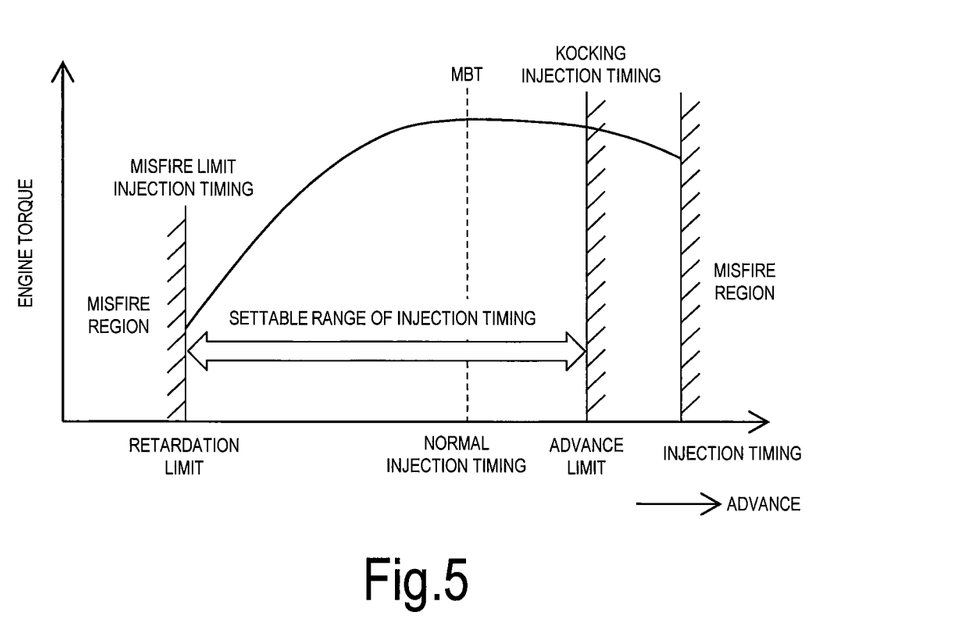
FIG. 5 is a diagram for illustrating a settable range of an ignition timing when a normal ignition timing is a MBT.
Figure 6:
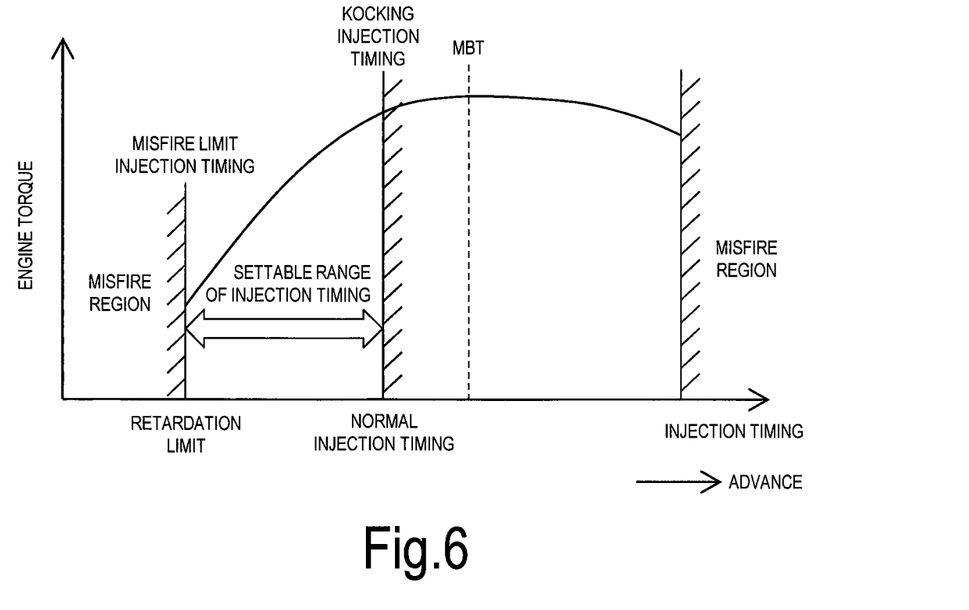
FIG. 6 is a diagram for illustrating a settable range of an ignition timing when a normal ignition timing is a knocking ignition timing.

FIGS. 5 and 6 are diagrams for illustrating a settable range of the ignition timing. The horizontal axis of the graphs shown in FIGS. 5 and 6 represent the ignition timing, and the vertical axis of the graphs represent an engine torque. A normal ignition timing is set to the ignition timing on a retardation side among a MBT (Minimum advance for the Best Torque) and a knocking ignition timing. The knocking ignition timing is a limit ignition timing at which knocking occurs and is also called a trace knock ignition timing Both the MBT and the knocking ignition timing depend on the operating condition of the engine 2 such as an intake air temperature, an engine temperature, an engine speed and an engine load. Therefore, the knocking ignition timing may be on the retardation side with respect to the MBT depending on the operating condition of the engine 2, conversely, the MBT may be on the retardation side with respect to the knocking ignition timing.

In FIG. 5, a settable range of the ignition timing when the normal ignition timing is the MBT is illustrated. When the normal ignition timing is the MBT, the ignition timing can be advanced to the knocking ignition timing. Also, the ignition timing can be retarded until just before entering a misfire region. In this case, a misfire limit ignition timing just before entering the misfire region is the retardation limit of the ignition timing, and the knocking ignition timing is the advance limit of the ignition timing. However, if the misfire limit ignition timing of the advance side is on the retardation side with respect to the knocking ignition timing, the misfire limit ignition timing of the advance side is used as the advance limit of the ignition timing. As the ignition timing is retarded more with respect to the MBT, the engine torque decreases. On the other hand, when the ignition timing is advanced with respect to the MBT, there is a case where the engine torque does not decrease much even if the ignition timing deviates from the MBT.

In FIG. 6, a settable range of the ignition timing when the normal ignition timing is the knocking ignition timing is illustrated. When the normal ignition timing is the knocking ignition timing, the ignition timing cannot advance any further. In this case, a range from the misfire limit ignition timing to the knocking ignition timing is the settable range of the ignition timing That is, the misfire limit ignition timing is the retardation limit of the ignition timing, and the knocking ignition timing is the normal ignition timing and also the advance limit of the ignition timing.

In the ignition control by the engine ECU 7, the ignition timing is set with reference to the normal ignition timing within the range from the retardation limit to the advance limit. Note that, in the memory 72 of the engine ECU 7, a map in which a MBT, a knocking ignition timing, and a misfire limit ignition timing are related to an operating condition of the engine 2 is stored.

5. Setting of Energization Period of Injector and Energization Period of Ignition Coil In the fuel injection control by the engine ECU 7, an injection timing, that is, an injection end timing by the injector 25 is set, and also a fuel injection amount is calculated based on engine driving force requested from the hybrid ECU 6. When the fuel injection amount is determined, injection duration of the injector 25 is determined from the fuel injection amount, and an injection start timing is determined from the injection end timing and the injection duration. Since the injector 25 opens by energization to a solenoid, a period from the injection start timing to the injection end timing corresponds to an energization period of the injector 25. The injector 25 is energized by a driving signal supplied from the engine ECU 7 to the injector 25. Thus, the driving signal is an energization signal for energizing the solenoid of the injector 25.

In the ignition control by the engine ECU 7, an ignition timing by the spark plug 26 is set, and also energization duration of the ignition coil 27 is calculated in consideration of an engine speed, a battery voltage and the like. The energization duration of the ignition coil 27 is, in detail, duration during which the ignitor of the ignition coil 27 is energized. Since a shut off timing of energization is the ignition timing, when the ignition timing and the energization duration are determined, an energization period of the ignition coil 27 is determined from them. The ignition coil 27 is energized by an ignition instruction signal supplied from the engine ECU 7 to the ignition coil 27. Thus, the ignition instruction signal is an energization signal for energizing the ignitor of the ignition coil 27.

Figure 7:
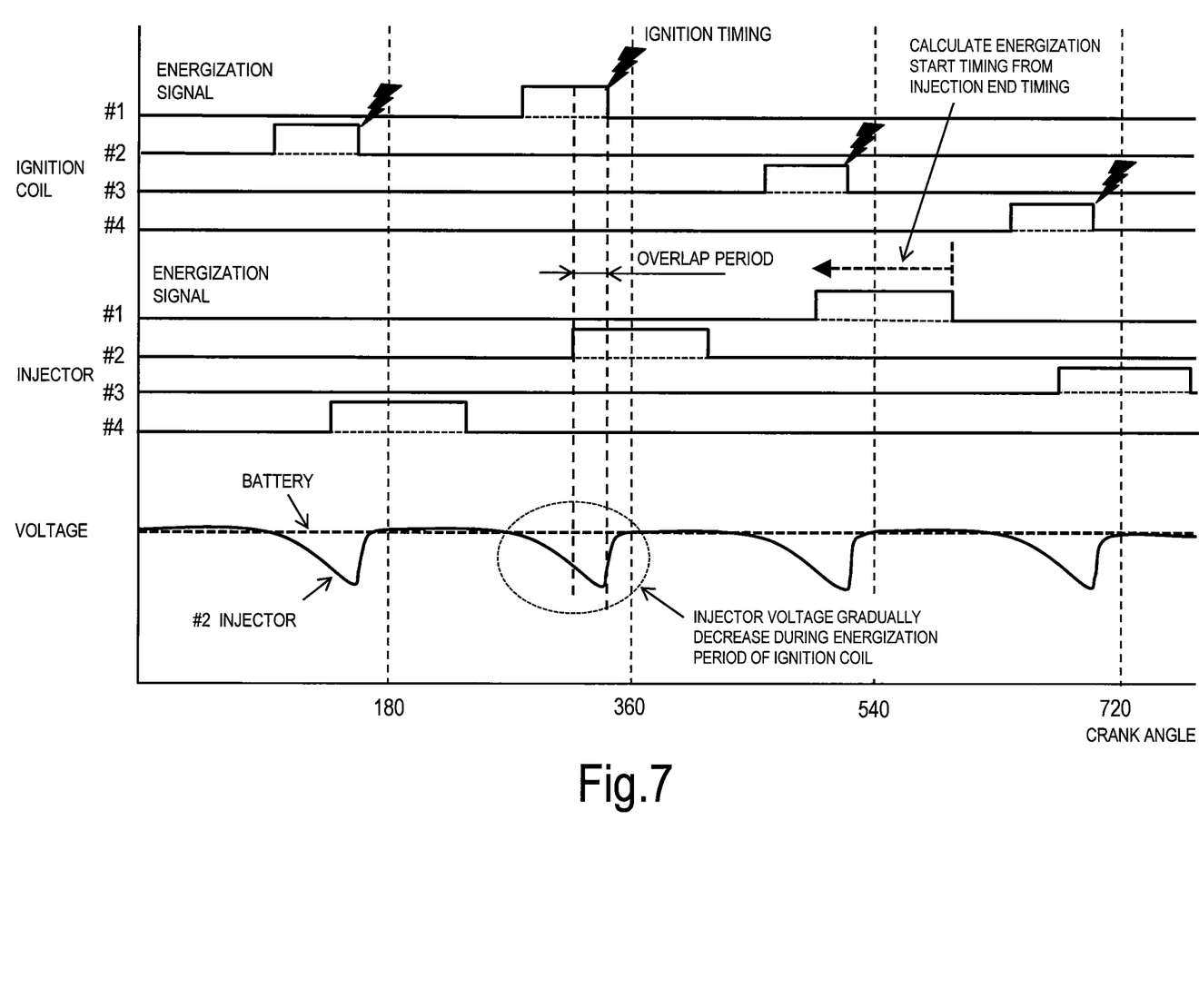
FIG. 7 is a diagram for illustrating influence of overlap between an energization period of an ignition coil and an energization period of an injector on injector voltage.

As for a multi-cylinder engine, the energization period of the injector 25 is set for each cylinder, and the energization period of the ignition coil 27 is set for each cylinder. In the graph shown in FIG. 7, setting of each energization period in each of the four cylinders #1, #2, #3, and #4 is exemplified. In FIG. 7, a period during which the energization signal of the ignition coil 27 rises is the energization period of the ignition coil 27, and a period during which the energization signal of the injector 25 rises is the energization period of the injector 25. However, the horizontal axis of the graph is not crank angle but time. The energization period is converted to a crank angle using an engine speed.

As for a multi-cylinder engine including a four-cylinder engine, there is a case where the energization period of the injector 25 of one cylinder overlaps with the energization period of the ignition coil 27 of another cylinder. In an example shown in FIG. 7, the energization period of the injector 25 of the second cylinder #2 overlaps with the energization period of the ignition coil 27 of the first cylinder #1. The ignition coil 27 and the injector 25 share the battery 10 that is a power source. Thus, overlap of the energization period of the ignition coil 27 and the energization period of the injector 25 reduces the current flowing to the injector 25 and reduces the voltage applied to the injector 25.

In the bottom part of FIG. 7, an example of the variation of the voltage applied to the injector 25 of the second cylinder #2 with crank angle is drawn in comparison with the voltage of the battery 10 recognized by the engine ECU 7. While the voltage of the battery 10 recognized by the engine ECU 7 is constant, the voltage applied to the injector 25 of the second cylinder #2 gradually decreases during the energization period of the ignition coil 27, and recovers upon the termination of the energization to the ignition coil 27. Since the ignition coils 27 of all the cylinders and the injectors 25 of all the cylinders share a power source, when one of the ignition coils 27 is energized, the voltage is decreased in all the injectors 25. Therefore, even in the cylinders other than the second cylinder #2, the voltage decrease simultaneously occurs as shown in FIG. 7.

When the energization period of the ignition coil 27 overlaps with the energization period of the injector 25, the injector 25 doesn't open sufficiently due to the voltage decrease during the overlap period, and cannot inject necessary fuel. Shortage of a fuel injection amount may make air fuel ratio lean to deteriorate emission performance. Then, when the energization period of the ignition coil 27 overlaps with the energization period of the injector 25 in the engine control, the engine ECU 7 executes correction processing for reducing the overlap period.

6. Engine Control According to the First Embodiment

Hereinafter, with respect to the engine control executed by the engine ECU 7, three embodiments will be described. Note that the engine control described below is engine control constituting driving force control of the hybrid vehicle 1 and is included in the engine control executed in step S3 of the control flow shown in FIG. 2.

Figure 8:
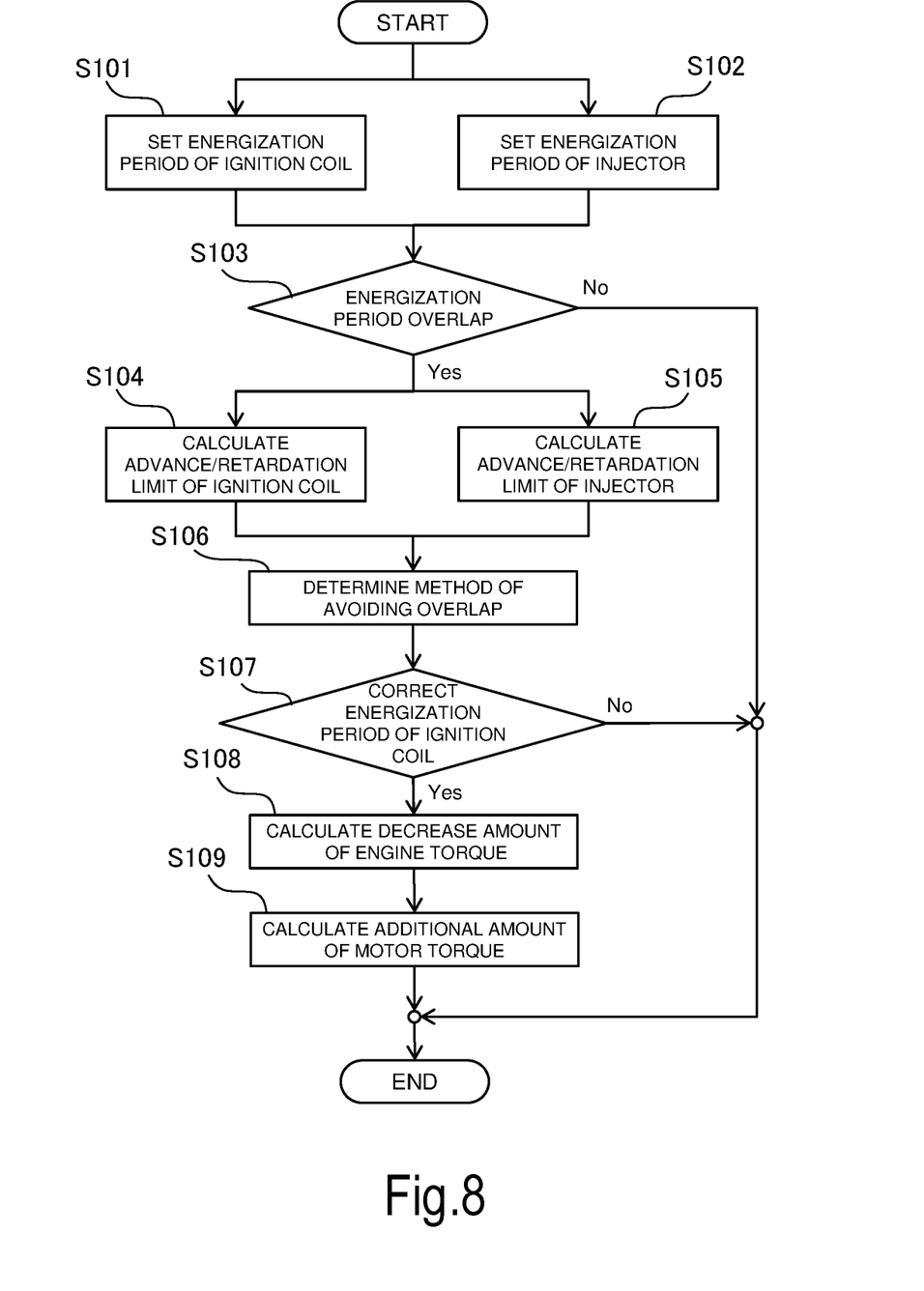
FIG. 8 is a flowchart showing a control flow of engine control according to a first embodiment of the present disclosure.

FIG. 8 is a flowchart showing a control flow of the engine control according to the first embodiment. The engine ECU 7 executes a routine expressed by this control flow at a predetermined cycle. First, the engine ECU 7 executes setting processing consisting of processing in step S101 and processing in step S102.

In step S101, the engine ECU 7 sets an energization period of the ignition coil 27 in accordance with an operating condition of the engine 2. More specifically, the engine ECU 7 calculates a MBT and a knocking ignition timing based on the operating condition of the engine 2, and selects the ignition timing on a retardation side among the MBT and the knocking ignition timing. Then, the engine ECU 7 calculates the energization period of the ignition coil 27 from the ignition timing and energization duration. Note that calculation of the energization period of the ignition coil 27 is executed, for example, on the ignition coil 27 of the cylinder where the next ignition is performed.

In step S102, the engine ECU 7 sets an energization period of the injector 25 in accordance with the operating condition of the engine 2. More specifically, the engine ECU 7 calculates an injection timing based on the operating condition of the engine 2, and calculates injection duration based on driving force requested from the hybrid ECU 6. Then, the engine ECU 7 calculates the energization period of the injector 25 from the injection timing and the injection duration. Note that calculation of the energization period of the injector 25 is executed, for example, on the injector 25 of the cylinder where the next fuel injection is performed.

After the processing in step S101 and step S102, the engine ECU 7 executes determination in step S103. Note that, though the processing in step S101 and the processing in step S102 are executed in parallel in the control flow shown in FIG. 8, the processing in step S102 may be executed after the processing in step S101 and vice versa.

In step S103, the engine ECU 7 determines whether the energization period of the ignition coil 27 set in step S101 overlaps with the energization period of the injector 25 set in step S102. If overlap doesn't exist, the routine of the engine control ends once. In this case, the ECU 7 adopts respective energization periods set in step S101 and step S102 and executes the ignition control and the fuel injection control.

If it is determined in step S103 that there exists overlap of the energization periods, the ECU 7 executes correction processing consisting of processing in step S104, processing in step S105 and processing in step S106.

In step S104, the engine ECU 7 calculates an advance limit and a retardation limit of the energization period of the ignition coil 27. In the case where the energization period of the ignition coil 27 is set so as to adjust the ignition timing to the MBT in step S101, the advance limit of the energization period of the ignition coil 27 is the energization period when the ignition timing is advanced to the knocking ignition timing. Also, the retardation limit of the energization period of the ignition coil 27 is the energization period when the ignition timing is retarded to a misfire limit ignition timing. In the case where the energization period of the ignition coil 27 is set so as to adjust the ignition timing to the knocking ignition timing in step S101, the current energization period of the ignition coil 27 is the advance limit. Also, the retardation limit of the energization period of the ignition coil 27 is the energization period when the ignition timing is retarded to the misfire limit ignition timing.

In step S105, the engine ECU 7 calculates an advance limit and a retardation limit of the energization period of the injector 25. As described above, when an injection end timing of the injector 25 is retarded, HC concentration in exhaust gas increases because enough time for atomization of injected fuel cannot be obtained. The retardation limit of the energization period of the injector 25 is the energization period when the injection timing is retarded until the HC concentration in the exhaust gas reaches an allowable limit value. On the other hand, the advance limit of the energization period of the injector 25 relates to an energization period of another ignition coil 27 that is different from the ignition coil 27 of which the energization period overlaps with the energization period of the injector 25 under the current setting.

The advance limit of the energization period of injector 25 will be described in detail. In the example shown in FIG. 7, the energization period of the injector 25 of the second cylinder #2 overlaps with the energization period of the ignition coil 27 of the first cylinder #1. Here, as the energization period of the injector 25 of the second cylinder #2 is advanced, the overlap with the energization period of the ignition coil 27 of the first cylinder #1 is removed in due course. However, if the energization period of the injector 25 of the second cylinder #2 is further advanced, then overlap with the energization period of the ignition coil 27 of the second cylinder #2 will occur. That is, the advance limit of the energization period of the injector 25 is the energization period when the injection timing is advanced until the energization period of the injector 25 overlaps with the energization period of the preceding ignition coil 27 in the ignition sequence.

After the processing in step S104 and step S105, the engine ECU 7 executes determination in step S106. Note that, though the processing in step S104 and the processing in step S105 are executed in parallel in the control flow shown in FIG. 8, the processing in step S105 may be executed after the processing in step S104 and vice versa.

In step S106, the engine ECU 7 determines a method of avoiding overlap between the energization period of the ignition coil 27 and the energization period of the injector 25. The method of avoiding overlap is any one of correcting the energization period of the injector 25, correcting the energization period of the ignition coil 27, and correcting both.

The engine ECU 7 preferentially executes correcting the energization period of the injector 25. More specifically, the engine ECU 7 corrects the energization period of the injector 25 within a range from the retardation limit to the advance limit calculated in step S105 so as to remove or minimize the overlap period between the energization period of the ignition coil 27 and the energization period of the injector 25. When the overlap period can be removed both by retarding and by advancing the energization period of the injector 25, the engine ECU 7 corrects the energization period to the side where the HC concentration in the exhaust gas can be suppressed more.

When the overlap period isn't removed by correcting the energization period of the injector 25, the engine ECU 7 corrects the energization period of the injector 25 so as to minimize the overlap period and then corrects the energization period of the ignition coil 27. In the case where the energization period of the ignition coil 27 is set to adjust the ignition timing to the MBT, when the overlap period can be removed both by retarding and by advancing the energization period of the ignition coil 27, the engine ECU 7 corrects the energization period to the side where decrease of torque of the engine 2 is lower.

Also, in the case where the energization period of the ignition coil 27 is set so as to adjust the ignition timing to the MBT, if the overlap period can be removed by correction within a range where a torque decrease rate with respect to a torque obtained at the MBT becomes equal to or less than a predetermined value (for example several %), the engine ECU 7 preferentially executes correcting the energization period of the ignition coil 27 without correcting the energization period of the injector 25. When the overlap period can be removed both by retarding and by advancing the energization period of the ignition coil 27, the engine ECU 7 corrects the energization period to the side where decrease of torque of the engine 2 is lower.

However, depending on the operating condition of the engine 2, there is a possibility that the overlap period cannot be removed by correcting the energization period of the injector 25 to the retardation limit or the advance limit and further correcting the energization period of the ignition coil 27 to the retardation limit or the advance limit. In such the case, the engine ECU 7 extends the energization period of the injector 25 in accordance with the overlap period. When the energization period of the injector 25 overlaps with the energization period of the ignition coil 27, the injector 25 does not open sufficiently due to voltage drop and cannot inject necessary amount of fuel. However, it becomes possible to inject necessary amount of fuel by extending the energization period of the injector 25.

Next, in step S107, the engine ECU 7 determines whether the energization period of the ignition coil 27 is corrected or not. If the energization period of the ignition coil 27 is not corrected, the routine of the engine control ends once. In this case, the ECU 7 adopts energization periods corrected in step S106 and executes the ignition control and the fuel injection control.

In the case where it is determined in step S107 that the energization period of the ignition coil 27 is corrected, driving force of the engine 2 becomes insufficient with respect to the driving force requested from the hybrid ECU 6. In this case, as described in the description about the driving force control of the hybrid vehicle 1, the control ECU 7 outputs a request to the motor ECU 8 so that a shortage of driving force is compensated by the driving force of the motor 3 (refer to the control flow shown in FIG. 2). For this purpose, processing in step 108 and step 109 described below is executed.

In step S108, the engine ECU 7 calculates a decrease amount of torque of the engine 2 accompanied by the correction of the energization period of the ignition coil 27. This calculation uses a map in which a torque of the engine 2 is related to an ignition timing, an intake air amount and an air fuel ratio, which are control parameters determining the torque. Since a shut off timing of the energization to the ignition coil 27 is the ignition timing, the ignition timing is also corrected by correcting the energization period of the ignition coil 27. By calculating the torque obtained by the ignition timing before the correction and the torque obtained by the ignition timing after the correction by using the map, and calculating the difference between them, the decrease amount of torque of the engine 2 can be calculated.

In step S109, the engine ECU 7 calculates the shortage of driving force from the decrease amount of torque of the engine 2 calculated in step S108. Then, the engine ECU 7 calculates an additional amount of torque of the motor 3 necessary to compensate for the shortage of driving force. The engine ECU 7 outputs a request to the motor ECU 8 to increase the torque of the motor 3 by the calculated additional amount. The motor ECU 8 increases the torque of the motor 3 in response to the request from the engine ECU 7. This realizes the driving force requested from the hybrid ECU 6 in the hybrid system as a whole even if the driving of the engine 2 decreases due to the correction of the energization period of the ignition coil 27.

As described above, according to the engine control according to the first embodiment, if the overlap period is removed by correcting the energization period of the injector 25, it is possible to energize the ignition coil 27 with the energization period set in accordance with the operating condition of the engine 2. Also, even if the energization period of the ignition coil 27 is corrected, a correction amount thereof is minimized. That is, according to the engine control according to the first embodiment, it is possible to reduce the overlap period between the energization period of the ignition coil 27 and the energization period of the injector 25 while prioritizing realization of ignition at a normal ignition timing. It goes without saying that reducing the overlap period includes removing the overlap period.

7. Engine Control According to the Second Embodiment

Figure 9:
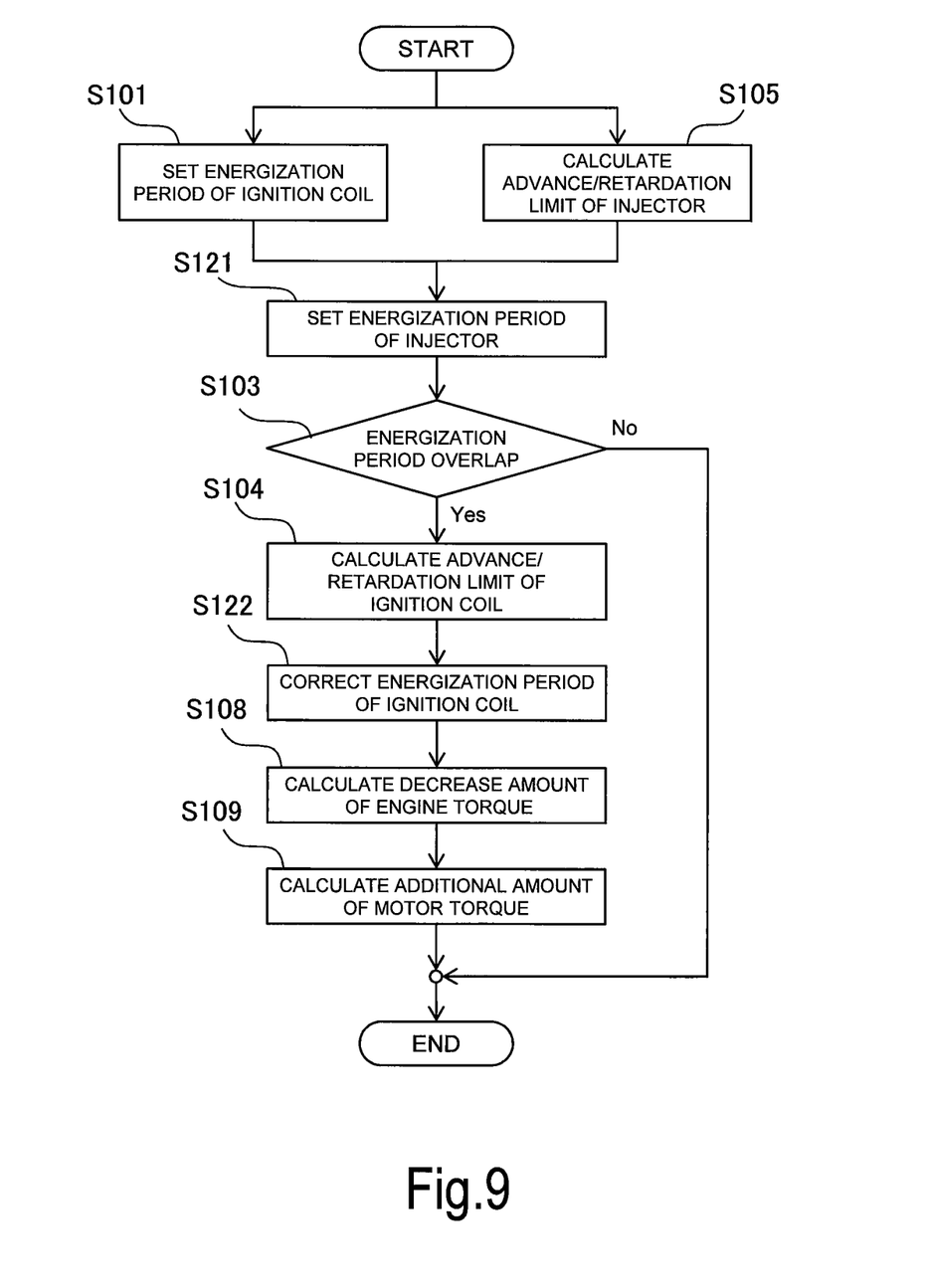
FIG. 9 is a flowchart showing a control flow of engine control according to a second embodiment of the present disclosure.

FIG. 9 is a flowchart showing a control flow of the engine control according to the second embodiment. In the second embodiment, the engine ECU 7 executes a routine expressed by this control flow at a predetermined cycle. In the control flow shown in FIG. 9, the processing given the same step number as the processing in the control flow shown in FIG. 8 means the processing having the same content as the processing in the control flow shown in FIG. 8. Concerning such the processing, description about the content thereof is omitted or simplified.

In the second embodiment, first, the engine ECU 7 executes setting processing consisting of processing in step S101, processing in step S105 and processing in step S121. In step S101, the engine ECU 7 sets an energization period of the ignition coil 27 in accordance with an operating condition of the engine 2. In step S105, the engine ECU 7 calculates an advance limit and a retardation limit of an energization period of the injector 25.

After the processing in step S101 and step S105, the engine ECU 7 executes processing in step S121. Note that, though the processing in step S101 and the processing in step S105 are executed in parallel in the control flow shown in FIG. 9, the processing in step S105 may be executed after the processing in step S101 and vice versa.

In step S121, the engine ECU 7 sets the energization period of the injector 25 within a range from the retardation limit to the advance limit calculated in step S105 so as to minimize the overlap period between the energization period of the ignition coil 27 set in step S101 and the energization period of the injector 25. Note that minimizing the overlap period includes removing the overlap period. When the energization period of the injector 25 can be set on both a retardation side and an advance side with respect to the energization period of the ignition coil 27, the engine ECU 7 sets the energization period on the side where the HC concentration in the exhaust gas can be suppressed more.

After the above processing, the engine ECU 7 executes determination in step S103. In step S103, the engine ECU 7 determines whether or not the energization period of the ignition coil 27 set in step S101 overlaps with the energization period of the injector 25 set in step S121. If overlap doesn't exist, the routine of the engine control ends once. In this case, the ECU 7 adopts respective energization periods set in step S101 and step S121 and executes the ignition control and the fuel injection control.

If it is determined in step S103 that there exists overlap of the energization periods, the ECU 7 executes correction processing consisting of processing in step S104 and processing in step S122. In step S104, the engine ECU 7 calculates an advance limit and a retardation limit of the energization period of the ignition coil 27.

Following the processing in step S104, the engine ECU 7 executes the processing in step S122. In step S122, the engine ECU 7 corrects the energization period of the ignition coil 27 within a range from the retardation limit to the advance limit calculated in step S104 so as to remove the overlap period between the energization period of the ignition coil 27 and the energization period of the injector 25 set in step S121. In the case where the energization period of the ignition coil 27 is set so as to adjust the ignition timing to the MBT, if the overlap period can be removed both by retarding and by advancing the energization period of the ignition coil 27, the engine ECU 7 corrects the energization period to the side where decrease of torque of the engine 2 is lower. When the overlap period cannot be removed even if the energization period of the ignition coil 27 is corrected to either the retardation limit or the advance limit, the engine ECU 7 extends the energization period of the injector 25 in accordance with the overlap period.

When the energization period of the ignition coil 27 is corrected, driving force of the engine 2 becomes insufficient with respect to the driving force requested from the hybrid ECU 6. In this case, the engine ECU 7 outputs a request to the motor ECU 8 so that a shortage of driving force is compensated by the driving force of the motor 3. For this purpose, processing in step 108 and step 109 is executed. In step S108, the engine ECU 7 calculates a decrease amount of torque of the engine 2 accompanied by the correction of the energization period of the ignition coil 27. In step S109, the engine ECU 7 calculates an additional amount of torque of the motor 3 necessary to compensate for the shortage of driving force, based on the decrease amount of torque of the engine 2 calculated in step S108.

As described above, according to the engine control according to the second embodiment, if the setting of the energization period of the injector 25 doesn't generate the overlap period, it is possible to energize the ignition coil 27 with the energization period set in accordance with the operating condition of the engine 2. Also, even if the overlap period is generated between the energization period of the ignition coil 27 and the energization period of the injector 25, since the overlap period is minimized, a correction amount of the energization period of the ignition coil 27 is minimized. That is, according to the engine control according to the second embodiment, as well as the engine control according to the first embodiment, it is possible to reduce the overlap period between the energization period of the ignition coil 27 and the energization period of the injector 25 while prioritizing realization of ignition at a normal ignition timing.

8. Engine Control According to the Third Embodiment

Figure 10:
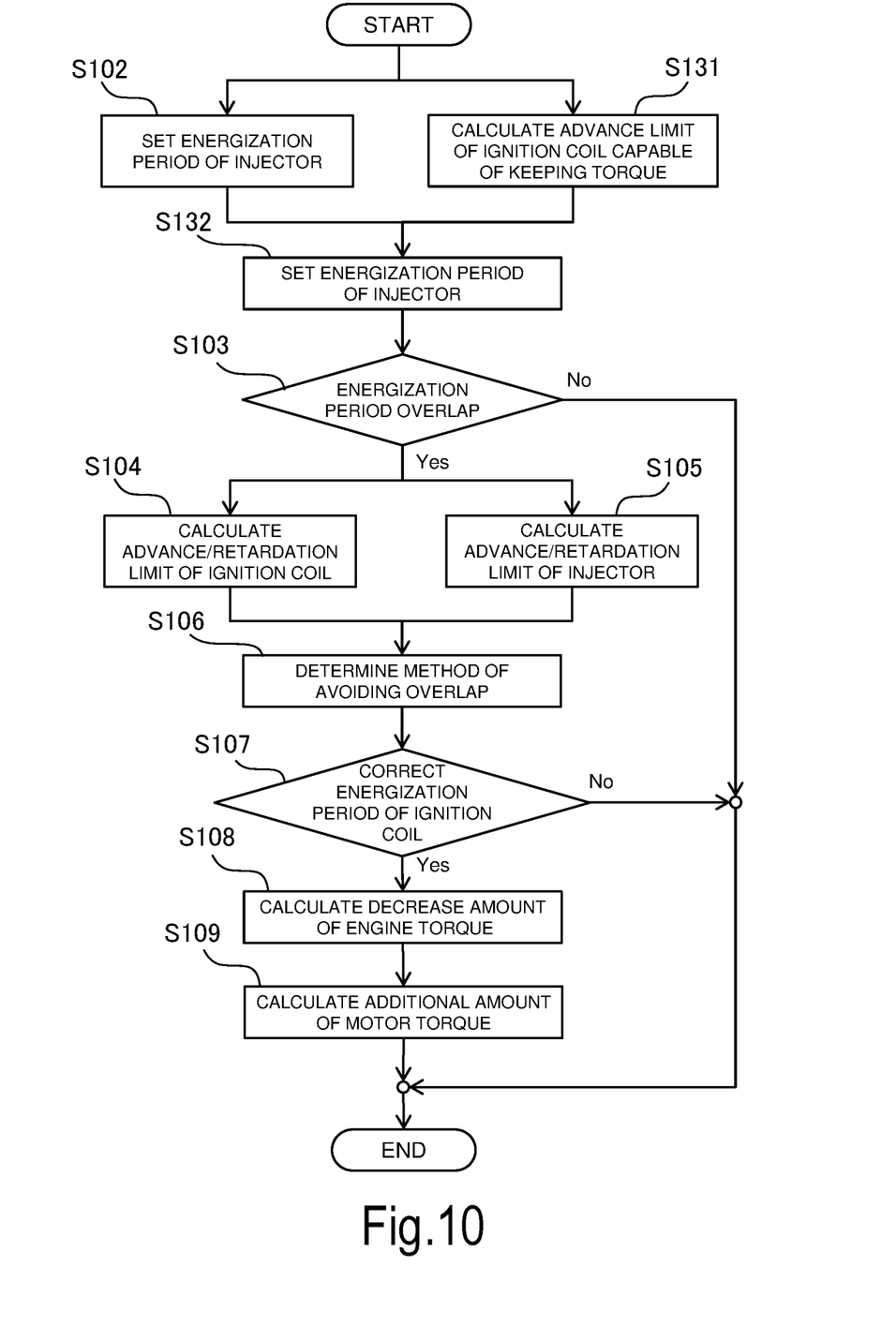
FIG. 10 is a flowchart showing a control flow of engine control according to a third embodiment of the present disclosure.

FIG. 10 is a flowchart showing a control flow of the engine control according to the third embodiment. In the third embodiment, the engine ECU 7 executes a routine expressed by this control flow at a predetermined cycle. In the control flow shown in FIG. 10, the processing given the same step number as the processing in the control flow shown in FIG. 8 means the processing having the same content as the processing in the control flow shown in FIG. 8. Concerning such the processing, description about the content thereof is omitted or simplified.

In the third embodiment, first, the engine ECU 7 executes setting processing consisting of processing in step S102, processing in step S131 and processing in step S132. In step S102, the engine ECU 7 sets an energization period of the injector 25 in accordance with an operating condition of the engine 2.

In step S131, the engine ECU 7 calculates an advance limit of the energization period of the ignition coil 27 at which it is possible to maintain a torque obtained at a MBT. Being possible to maintain the torque obtained at the MBT means being possible to suppress a torque decrease rate with respect to the torque obtained at the MBT equal to or less than a predetermined value (for example several %). Torque sensitivity with respect to ignition timing change depends on the operating condition of the engine 2. The engine ECU 7 calculates the advance limit of the energization period of the ignition coil 27 using a map in which an ignition timing is related to a torque and an operating condition of the engine 2.

After the processing in step S102 and step S131, the engine ECU 7 executes processing in step S132. Note that, though the processing in step S102 and the processing in step S131 are executed in parallel in the control flow shown in FIG. 10, the processing in step S131 may be executed after the processing in step S102 and vice versa.

In step S132, the engine ECU 7 sets the energization period of the ignition coil 27 within a range from the MBT to the advance limit calculated in step S131 so as to minimize the overlap period between the energization period of the ignition coil 27 and the energization period of the injector 25 set in step S102. Note that minimizing the overlap period includes removing the overlap period. However, when a knocking ignition timing is on a retardation side with respect to the MBT, the ignition timing cannot be advanced over the knocking ignition timing. In this case, the engine ECU 7 sets the energization period of the ignition coil 27 so as to adjust the ignition timing to the knocking ignition timing.

After the above processing, the engine ECU 7 executes determination in step S103. In step S103, the engine ECU 7 determines whether or not the energization period of the ignition coil 27 set in step S132 overlaps with the energization period of the injector 25 set in step S102. If overlap doesn't exist, the routine of the engine control ends once. In this case, the ECU 7 adopts respective energization periods set in step S102 and step S132 and executes the ignition control and the fuel injection control.

If it is determined in step S103 that there exists overlap of the energization periods, the ECU 7 executes correction processing consisting of processing in step S104, processing in step S105 and processing in step S106. In step S104, the engine ECU 7 calculates an advance limit and a retardation limit of the energization period of the ignition coil 27. In step S105, the engine ECU 7 calculates an advance limit and a retardation limit of the energization period of the injector 25. In step S106, the engine ECU 7 determines a method of avoiding overlap between the energization period of the ignition coil 27 and the energization period of the injector 25.

After the correction processing, the engine ECU 7 executes determination in step S107. In step S107, the engine ECU 7 determines whether the energization period of the ignition coil 27 is corrected or not. If the energization period of the ignition coil 27 is not corrected, the routine of the engine control ends once. In this case, the ECU 7 adopts energization periods corrected in step S106 and executes the ignition control and the fuel injection control.

In the case where it is determined in step S107 that the energization period of the ignition coil 27 is corrected, driving force of the engine 2 becomes insufficient with respect to the driving force requested from the hybrid ECU 6. In this case, the control ECU 7 outputs a request to the motor ECU 8 so that a shortage of driving force is compensated by the driving force of the motor 3. For this purpose, processing in step 108 and step 109 is executed. In step S108, the engine ECU 7 calculates a decrease amount of torque of the engine 2 accompanied by the correction of the energization period of the ignition coil 27. In step S109, the engine ECU 7 calculates an additional amount of torque of the motor 3 necessary to compensate for the shortage of driving force, based on the decrease amount of torque of the engine 2 calculated in step S108.

As described above, according to the engine control according to the third embodiment, if the setting of the energization period of the ignition coil 27 within a range where torque decrease can be suppressed doesn't generate the overlap period, it is possible to energize the injector 25 with the energization period set in accordance with the operating condition of the engine 2. Also, even if the energization period of the injector 25 is corrected, a correction amount thereof is minimized. Further, even if the overlap period is not removed by the correction of the energization period of the injector 25, the overlap period can be minimized or removed by the correction of the energization period of the ignition coil 27. That is, according to the engine control according to the third embodiment, it is possible to reduce the overlap period between the energization period of the ignition coil 27 and the energization period of the injector 25 while prioritizing realization of fuel injection at a normal injection timing.

9. Other Embodiments

The hybrid vehicle 1 according to the above embodiments comprises a parallel type hybrid system. However, the present disclosure can be applied to a hybrid vehicle comprising a so-called series-parallel type hybrid system. Also, the present disclosure can be applied to a hybrid vehicle that uses driving force of a motor to assist an engine and doesn't travel by only the driving force of the motor, for example, a hybrid vehicle comprising an ISG (Integrated Starter Generator) hybrid system.

The engine 2 according to the above embodiments comprises a port injector that injects fuel to an intake port. However, the present disclosure can be applied to an engine comprising a direct injector that injects fuel directly into a combustion chamber. Further, the present disclosure can be applied to an engine comprising both the port injector and the direct injector.

What is claimed is:

1. An internal combustion engine having an ignition coil and an injector that share a power source, and having a controller that controls energization to the ignition coil and energization to the injector, the controller comprising:
at least one processor; and at least one memory coupled to the at least one processor, the at least one memory including at least one computer-executable program that upon execution causes the at least one processor to:

execute setting processing of setting an energization period of the ignition coil in accordance with an operating condition of the internal combustion engine; and execute correction processing of, when the energization period of the ignition coil overlaps with an energization period of the injector, correcting the energization period of the ignition coil so as to reduce an overlap period between the energization period of the ignition coil and the energization period of the injector, wherein the at least one computer-executable program upon execution causes the at least one processor to:

in the setting processing, set the energization period of the ignition coil in accordance with the operating condition of the internal combustion engine and also set the energization period of the injector in accordance with the operating condition of the internal combustion engine; and in the correction processing, correct the energization period of the ignition coil when the overlap period is not removed by correcting the energization period of the injector within a range from a predetermined retardation limit to a predetermined advance limit.

2. The internal combustion engine according to claim 1, wherein the at least one computer-executable program upon execution causes the at least one processor to:

in the setting processing, set the energization period of the ignition coil to adjust an ignition timing to a minimum advance for the best torque (MBT); and in the correction processing, advance the energization period of the ignition coil within a range where the ignition timing is not advanced over a knocking ignition timing, or retard the energization period of the ignition coil within a range where the ignition timing is not retarded over a misfire limit ignition timing.

3. The internal combustion engine according to claim 1, wherein the at least one computer-executable program upon execution causes the at least one processor to:

in the setting processing, set the energization period of the ignition coil to adjust an ignition timing to a knocking ignition timing; and in the correction processing, retard the energization period of the ignition coil within a range where the ignition timing is not retarded over a misfire limit ignition timing.

4. An internal combustion engine having an ignition coil and an injector that share a power source, and having a controller that controls energization to the ignition coil and energization to the injector, the controller comprising:

at least one processor; and at least one memory coupled to the at least one processor, the at least one memory including at least one computer-executable program that upon execution causes the at least one processor to:

execute setting processing of setting an energization period of the ignition coil in accordance with an operating condition of the internal combustion engine; and execute correction processing of, when the energization period of the ignition coil overlaps with an energization period of the injector, correcting the energization period of the ignition coil so as to reduce an overlap period between the energization period of the ignition coil and the energization period of the injector, wherein the at least one computer-executable program upon execution causes the at least one processor to:

in the setting processing, set the energization period of the ignition coil to adjust an ignition timing to a minimum advance for the best torque (MBT) and also set the energization period of the injector in accordance with the operating condition of the internal combustion engine; and in the correction processing, correct the energization period of the ignition coil within a range where a torque decrease rate with respect to a torque obtained at the MBT becomes equal to or less than a predetermined value and, when the overlap period is not removed by correcting the energization period of the ignition coil, also correct the energization period of the injector within a range from a predetermined retardation limit to a predetermined advance limit.

5. An internal combustion engine having an ignition coil and an injector that share a power source, and having a controller that controls energization to the ignition coil and energization to the injector, the controller comprising:

at least one processor; and at least one memory coupled to the at least one processor, the at least one memory including at least one computer-executable program that upon execution causes the at least one processor to:

execute setting processing of setting an energization period of the ignition coil in accordance with an operating condition of the internal combustion engine; and execute correction processing of, when the energization period of the ignition coil overlaps with an energization period of the injector, correcting the energization period of the ignition coil so as to reduce an overlap period between the energization period of the ignition coil and the energization period of the injector, wherein the at least one computer-executable program upon execution causes the at least one processor to:

in the setting processing, set the energization period of the injector in accordance with the operating condition of the internal combustion engine and also set the energization period of the ignition coil so as to minimize the overlap period within a range where a torque decrease rate with respect to a torque obtained at a minimum advance for the best torque (MBT) becomes equal to or less than a predetermined value; and in the correction processing, when the overlap period is not removed by correcting the energization period of the injector within a range from a predetermined retardation limit to a predetermined advance limit, advance the energization period of the ignition coil within a range where the ignition timing is not advanced over a knocking ignition timing, or retard the energization period of the ignition coil within a range where the ignition timing is not retarded over a misfire limit ignition timing.

* * * * *